(12) United States Patent
Herbert

(10) Patent No.: US 9,711,025 B1
(45) Date of Patent: Jul. 18, 2017

(54) WARNING SYSTEM

(71) Applicant: Bud Herbert, Oyen (CA)

(72) Inventor: Bud Herbert, Oyen (CA)

( * ) Notice: Subject to any disclaimer, the term of this patent is extended or adjusted under 35 U.S.C. 154(b) by 0 days.

(21) Appl. No.: 15/130,901

(22) Filed: Apr. 15, 2016

(51) Int. Cl.
*G08B 21/02* (2006.01)
*G08B 5/22* (2006.01)
*G08G 1/0962* (2006.01)

(52) U.S. Cl.
CPC .............. *G08B 21/02* (2013.01); *G08B 5/22* (2013.01); *G08G 1/09626* (2013.01)

(58) Field of Classification Search
CPC ....... G08B 21/02; G08B 5/22; G08G 1/09626
See application file for complete search history.

(56) References Cited

U.S. PATENT DOCUMENTS

| 6,853,307 | B2 | 2/2005 | Nickerson |
| 2007/0018841 | A1 | 1/2007 | Nickerson |
| 2008/0055285 | A1* | 3/2008 | Ishikawa ............... G09F 21/045 345/204 |
| 2010/0052929 | A1 | 3/2010 | Jackett et al. |
| 2014/0184425 | A1 | 7/2014 | Smith et al. |

* cited by examiner

*Primary Examiner* — Curtis Odom
(74) *Attorney, Agent, or Firm* — RG Patent Consulting, LLC; Rachel Gilboy

(57) ABSTRACT

A warning system for emergency first responders approaching high voltage power lines, said warning system comprising: a sensor unit; a warning unit. The sensor unit includes a sensor unit comprising: an encasement, an antenna, a voltage meter; a power source; and a transponder. The sensor unit and the warning unit are separated from one another and adapted such that the sensor unit can be attached to the roof of an emergency vehicle or shoes of an emergency responder, and the warning unit can be attached to a dashboard of the emergency vehicle of the body of the emergency responder, and be able to project a warning image for the emergency responder to view.

10 Claims, 6 Drawing Sheets

WARNING SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of warning devices and more specifically relates to a warning system for emergency first responders approaching high voltage power lines to save lives, by preventing workers from getting too close to live power lines and being electrocuted. The invention will also warn heavy equipment when the get too close to overhead power lines. This will save construction workers, and farmers that operate the higher equipment that may come within ten feet to a live power line.

2. Description of the Related Art

Electric power transmission is the bulk movement of electrical energy from a generating site, such as a power plant, to an electrical substation. The interconnected lines which facilitate this movement are known as a transmission network. This is distinct from the local wiring between high-voltage substations and customers, which is typically referred to as electric power distribution. The combined transmission and distribution network is known as the power grid. Everyone should be familiar with the proper safety procedures when working around power lines. Workers should stay at least ten feet away from overhead power lines, and they should be aware of the location of any visible or hidden power lines before beginning projects.

A live power line creates a magnetic field around it, giving off an electromotive force (EMF). As a person moves closer to the source of the EMF, the voltage they could encounter increases. The current will take the path of least resistance, which could be to the ground through the human body. Once a power line has been tripped, most have an automatic re-closure, and there will be three attempts to overcome the interruption before shuts off and stays off. This remedy helps to eliminate nuisance trips, so a lineman does not have to come out for minor interruptions. However, this does not eliminate the large problem when construction workers, farmers, etc. cross power lines. This usually happens while they are traveling at low speeds and off road.

Downed power lines are also very dangerous for first responders. When linesmen have to replace broken power poles, they are also exposed to potential danger as electricity can jump through the air. The boom being used is insulated to prevent problems, but if the boom is wet with rain or coated with salt water from being used near sea water, linesmen are more vulnerable to danger as water and especially salt water conduct electricity well. The tires on the boom truck could catch on fire as the current travels through the ground, exposing workers to a great risk of being electrocuted. Therefore a need exists for a warning system to prevent these kinds of accidental deaths structured and arranged to provide an early warning for workers, farmers, oilfield workers, and first responders when they are getting too near a live power line.

Various attempts have been made to solve problems found in warning device art. Among these are found in: U.S. Publication Number 2010/0052929 to Dave Jackett; U.S. Publication Number 2007/0018841 to Irvin Nickerson; U.S. Publication Number 20140184425 to Stephen L. Smith; and U.S. Pat. No. 6,853,307 to Irvin H. Nickerson. This prior art is representative of warning devices. None of the above inventions and patents, taken either singly or in combination, is seen to describe the invention as claimed.

Ideally, a warning system for emergency first responders approaching high voltage power lines should be user-friendly and safe in-use and, yet may operate reliably and be manufactured at a modest expense. Thus, a need exists for a warning system for emergency first responders approaching high voltage power lines to save lives, by preventing workers from getting too close to live power lines and being electrocuted and to avoid the above mentioned problems.

BRIEF SUMMARY OF THE INVENTION

In view of the foregoing disadvantages inherent in the known warning device art, the present invention provides a novel warning system for emergency first responders approaching high voltage power lines (Entitled Warning System). The general purpose of the present invention, which will be described subsequently in greater detail is to provide a warning system for emergency first responders approaching high voltage power lines to save lives, by preventing workers from getting too close to live power lines and being electrocuted.

A warning system for emergency first responders approaching high voltage power lines, said warning system comprising: a sensor unit; a warning unit. The sensor unit includes a sensor unit comprising: an encasement, an antenna, a voltage meter; a power source; and a transponder. The power source is electrically connected to and powers the antenna, the voltage meter, and the transponder. The antenna is adapted to send electric signals to the voltage meter; the voltage meter is adapted to receive and measure the antenna electrical signals for voltage quantities and variations and send a warning signal to the transponder upon detecting a predetermined level or change of electrical voltage; and the transponder is adapted to send a warning signal to a warning unit for emergency first responders. The sensor unit further comprises magnets on an external surface of its encasement adapted to removably attach to a metal surface of the emergency vehicle.

The warning unit includes an encasement, an antenna, a power source, and a hologram projector. The warning unit power source is electrically connected to and powers the warning unit antenna and the hologram projector. The antenna is adapted to receive the warning signal from the sensor unit transponder and a signal to the hologram projector, such that the hologram projector projects a holographic warning image for said emergency first responders to view. The holographic warning image forms the word "STOP". The warning unit further comprises a sound generator adapted to make a warning sound when the transponder sends a warning signal to the warning unit.

The sensor unit and the warning unit are separated from one another and adapted such that the sensor unit can be attached to the roof of any larger vehicle, and the warning unit can be attached to a dashboard of the emergency vehicle and be able to project the warning image upon an inner surface of a windshield of the large vehicle. The sensor unit power source and the warning unit power source are batteries. The sensor unit encasement and the warning unit encasement are formed from a plastic material.

A combination of an emergency vehicle, farmers, and construction workers, and a warning system for emergency first responders approaching high voltage power lines, said combination is also disclosed comprising: an emergency vehicle and a warning system. The emergency vehicle including: a roof; a dashboard; and a windshield. The warning system comprises a sensor unit and a warning unit. The sensor unit includes an encasement, an antenna, a voltage meter; a power source; and a transponder. The power source is electrically connected to and powers the antenna, the voltage meter, and the transponder. The antenna is adapted to send electric signals to the voltage meter; the voltage meter is adapted to receive and measure the antenna electrical signals for voltage quantities and variations and send a warning signal to the transponder upon detecting a predetermined level or change of electrical voltage. The transponder is adapted to send a warning signal to a warning unit for people in charge of operation the equipment.

The warning unit includes an encasement, an antenna, a power source; and a hologram projector. The warning unit power source is electrically connected to and powers the warning unit antenna and the hologram projector. The antenna is adapted to receive the warning signal from the sensor unit transponder and a signal to said hologram projector, such that the hologram projector projects a holographic warning image for the emergency first responders and operator of the equipment to view.

The sensor unit and the warning unit are separated from one another and adapted such that the sensor unit is attached to the roof of the emergency vehicle, and the warning unit is attached to the dashboard of said emergency vehicle and is able to project the warning image upon an inner surface of the windshield of the emergency vehicle. The warning unit further comprises a sound generator adapted to make a warning sound when the transponder sends a warning signal to the warning unit.

A combination of emergency responder footwear and a warning system for emergency first responders approaching high voltage power lines, said combination comprising: emergency responder footwear and a warning system. The emergency responder footwear includes at least one footwear article having a toe section having an external surface. The warning system includes: a sensor unit comprising an encasement, an antenna, a voltage meter, a power source; and a transponder. The power source is electrically connected to and powers the antenna, the voltage meter, and the transponder. The antenna is adapted to send electric signals to the voltage meter; the voltage meter is adapted to receive and measure the antenna electrical signals for voltage quantities and variations and send a warning signal to the transponder upon detecting a predetermined level or change of electrical voltage; and the transponder is adapted to send a warning signal to a warning unit for emergency first responders.

The warning unit comprises an encasement, an antenna, a power source, and a hologram projector. The warning unit power source is electrically connected to and powers the warning unit antenna and the hologram projector. The antenna is adapted to receive the warning signal from the sensor unit transponder and a signal to the hologram projector, such that the hologram projector projects a holographic warning image for the emergency first responders to view. The sensor unit and the warning unit are separated from one another and adapted such that the sensor unit is attached to the external surface of the toe portion of the at least one emergency responder footwear, and the warning unit is adapted to be releasably attached to the emergency responder and is able to project the warning image upon a surface nearby said emergency responder.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention Warning System constructed and operative according to the teachings of the present invention.

The various embodiments of the present invention will hereinafter be described in conjunction with the appended drawings, wherein like designations denote like elements.

DETAILED DESCRIPTION

Figure 1:
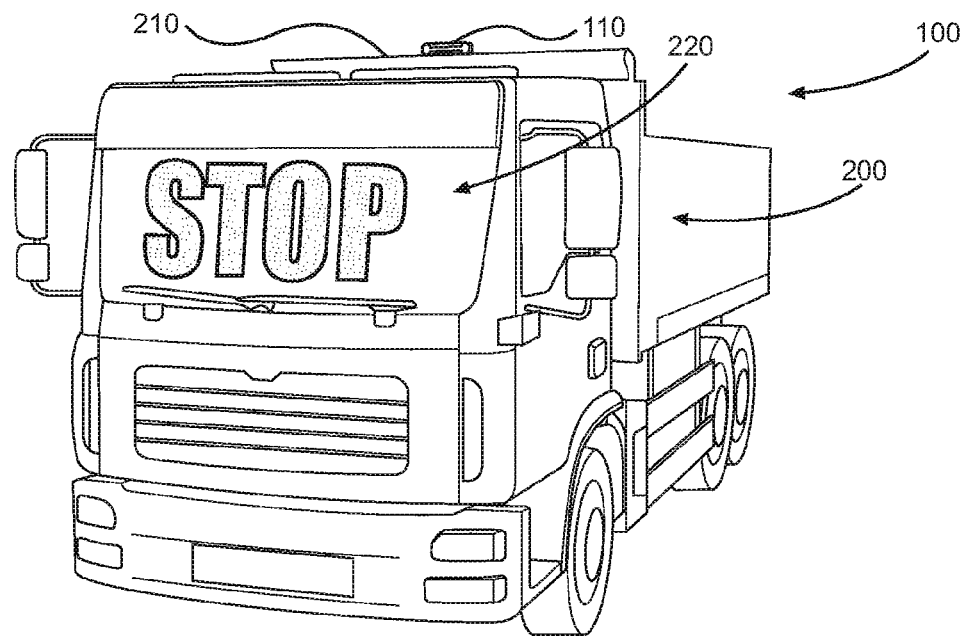
FIG. 1 shows a perspective view illustrating an in-use condition according to an embodiment of the present invention.

As discussed above, embodiments of the present invention relate to a warning device and more particularly to a warning system for emergency first responders approaching high voltage power lines to save lives, by preventing workers from getting too close to live power lines and being electrocuted.

Generally speaking, the warning system is being designed to save lives, which may be lost when workers get too close to live power lines and are killed accidentally. A sensor, which is battery operated or pulling power from the 12v system in the vehicle, is embedded in a protective case that can be attached to the roof of a vehicle with the magnets on the underside of the case. The higher voltage emitted by the power line as a vehicle moves closer would be picked up by the antenna on the device. When a readable signal is received by the sensor on a slow moving vehicle, a warning is sent to the transponder in the cab or on the dashboard.

The warning is in the form of a hologram will be illuminated and displayed on the operator's window. The hologram is the word "STOP" in large red letters. When vehicles are driving off-road, the sensor should be attached magnetically to the highest point on the load or vehicle, like the boom on a crane. As first responders need to watch for live wires that are downed, this device should be placed low on their vehicles or footwear with a loud sound or hologram to overcome the sirens and of the noises at an accident scene, near the ground where the downed wires would be. The sensor is good up to 1000 volts. If that voltage is surpassed, the sensor could destruct violently, so it is enclosed by a protective casing. Its antenna needs to be clear of any obstructions in order to provide the clearest warnings.

The unique features of this product will provide the following benefits for consumers everywhere:
  A warning system to save lives, by preventing workers from getting too close to live power lines and being electrocuted
  Will be used by first responders, to warn them when they are approaching live power lines which are downed
  Can also be used to monitor the rate of increasing voltage for linesmen to use when working close to power lines by providing a warning when the voltage is dangerously high Referring now to the drawings by numerals of reference there is shown in FIGS. 1-6 perspective views illustrating warning system 100 according to an embodiment of the present invention.

A warning system 100 for emergency first responders approaching high voltage power lines, said warning system comprising: a sensor unit 110; a warning unit 120. The sensor unit 110 comprises an encasement 111, an antenna 112, a voltage meter 113; a power source 114; and a transponder 115. The power source is electrically connected to and powers the antenna, the voltage meter, and the transponder. The antenna is adapted to send electric signals to the voltage meter; the voltage meter is adapted to receive and measure the antenna electrical signals for voltage quantities and variations and send a warning signal to the transponder upon detecting a predetermined level or change of electrical voltage; and the transponder is adapted to send a warning signal to a warning unit for emergency first responders. The sensor unit 110 further comprises magnets 116 on an external surface of its encasement adapted to removably attach to a metal surface of the emergency vehicle.

The warning unit 120 includes an encasement 121, an antenna 122, a power source 123, a hologram projector 124, and magnets 127 on an external surface of its encasement adapted to removably attach to a metal surface of the emergency vehicle, preferably upon the front dashboard 128. The warning unit power source is electrically connected to and powers the warning unit antenna and the hologram projector. The antenna is adapted to receive the warning signal from the sensor unit transponder and a signal to the hologram projector, such that the hologram projector projects a holographic warning image 125 for said emergency first responders to view. The holographic warning image forms the word "STOP". The warning unit 120 further comprises a sound generator 126 adapted to make a warning sound when said transponder sends a warning signal to said warning unit.

The sensor unit 110 and the warning unit 120 are separated from one another and adapted such that the sensor unit can be attached to the roof 210 of an emergency vehicle 200, and the warning unit can be attached to the dashboard 128 of the emergency vehicle and be able to project the warning image 125 upon an inner surface of the windshield 220 of said emergency vehicle 200. The sensor unit power source and the warning unit power source can be formed as batteries. The sensor unit encasement and the warning unit encasement can be formed from a plastic material.

Figure 2:
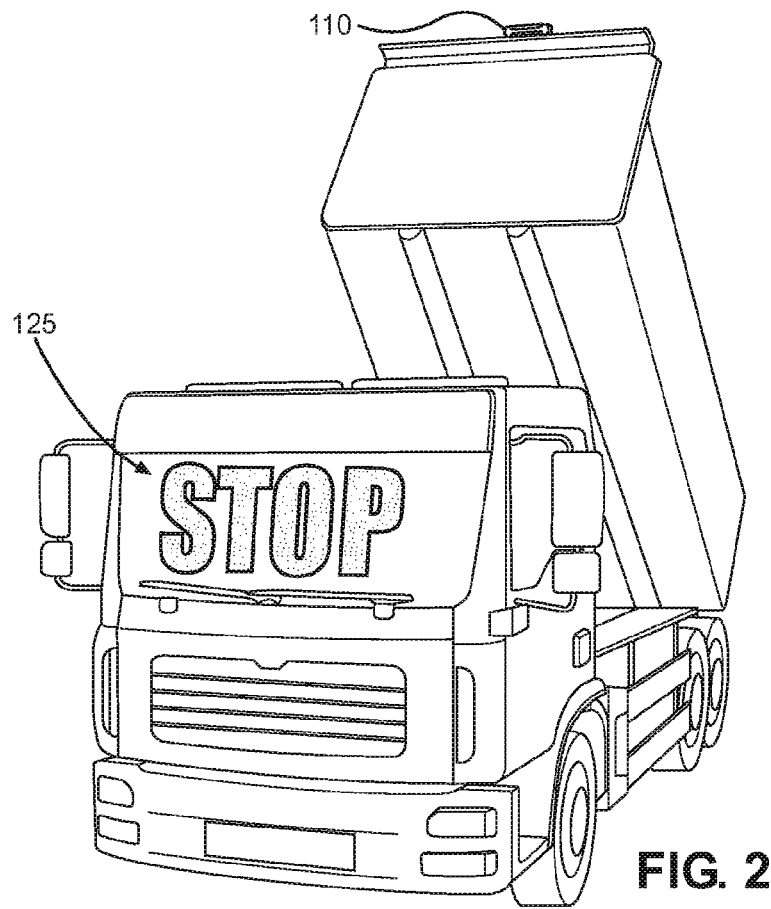
FIG. 2 shows a perspective view illustrating an in-use condition according to an embodiment of the present invention.
Figure 3:
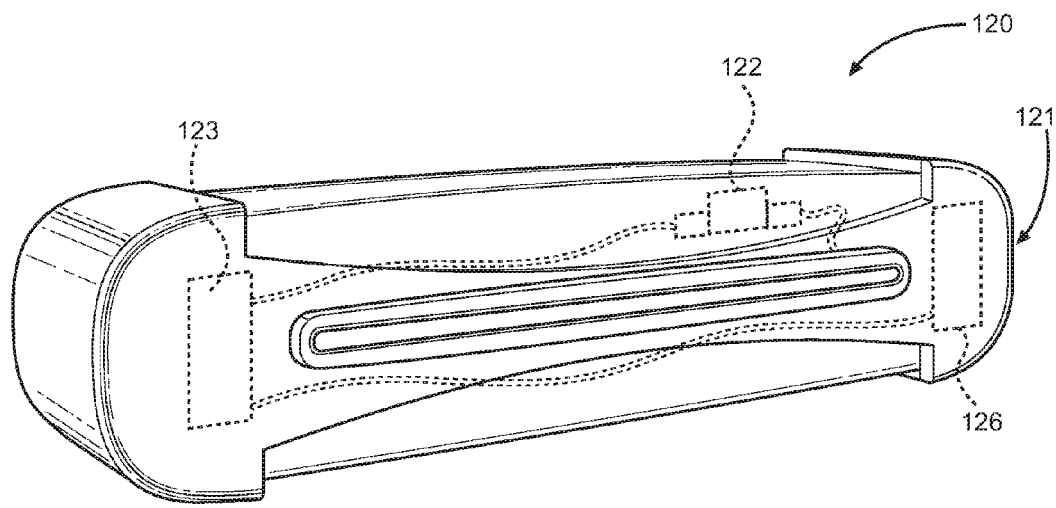
FIG. 3 shows a perspective view illustrating the warning unit according to an embodiment of the present invention.
Figure 4:
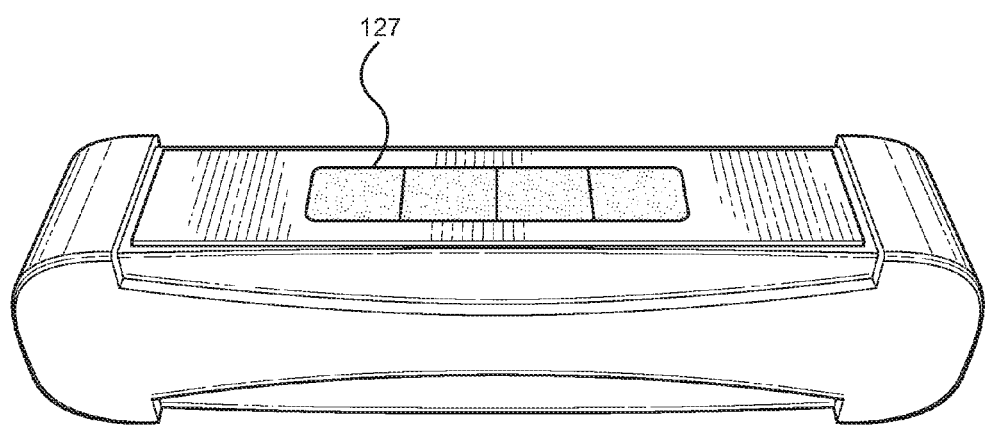
FIG. 4 shows a perspective view illustrating the warning unit according to an embodiment of the present invention.
Figure 5:
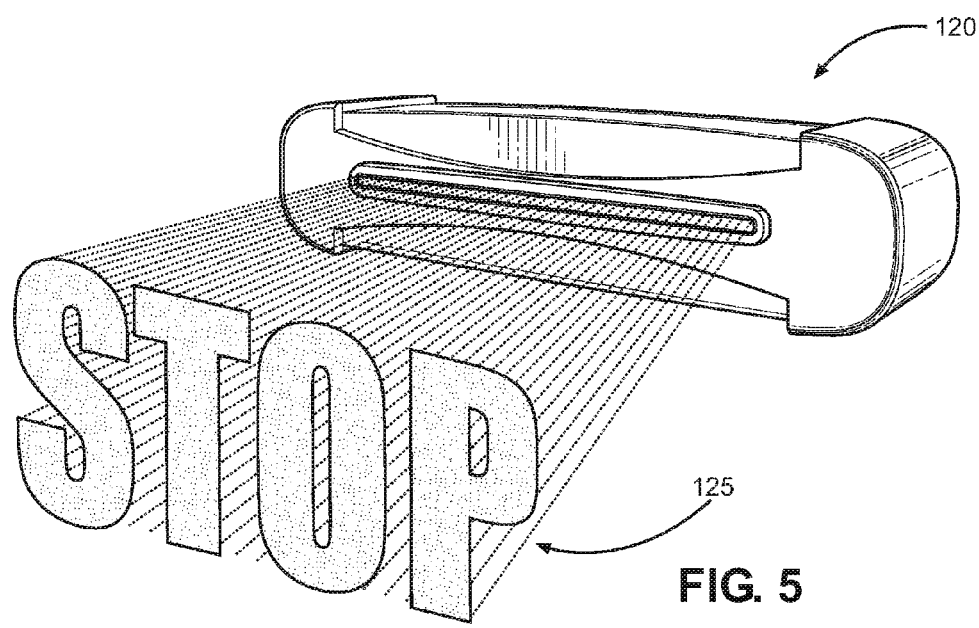
FIG. 5 shows a perspective view illustrating the warning unit according to an embodiment of the present invention.
Figure 6:
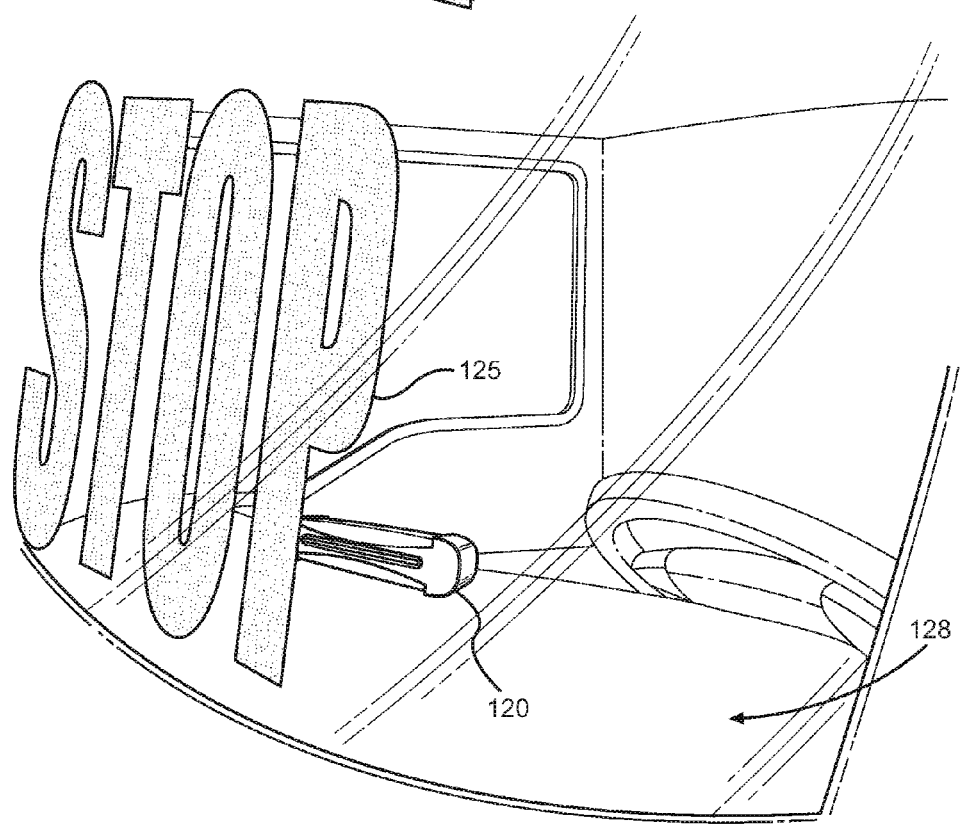
FIG. 6 shows a perspective view illustrating the warning unit in an in-use condition according to an embodiment of the present invention.
Figure 7:
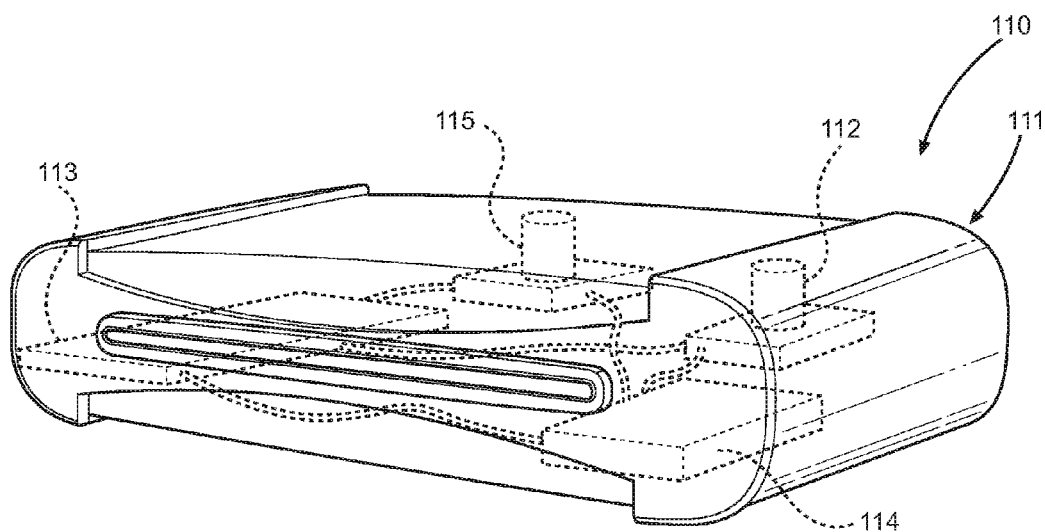
FIG. 7 shows a cut-away view illustrating the sensor unit and its components according to an embodiment of the present invention.
Figure 8:
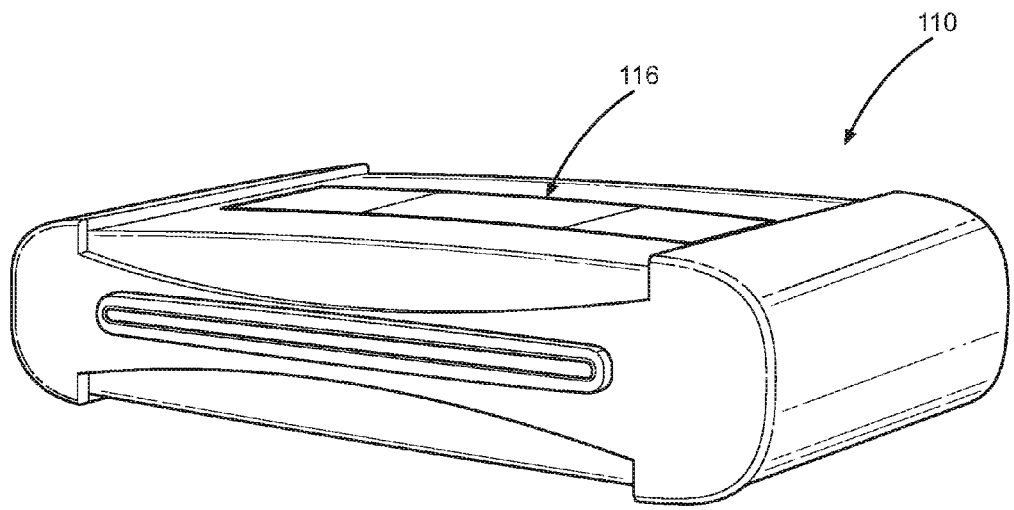
FIG. 8 shows a perspective view illustrating the sensor unit according to an embodiment of the present invention.

FIGS. 1, 2, and 6 show perspective views illustrating the combination of an emergency vehicle 200 and the warning system 100 according to an embodiment of the present invention.

Figure 9A:
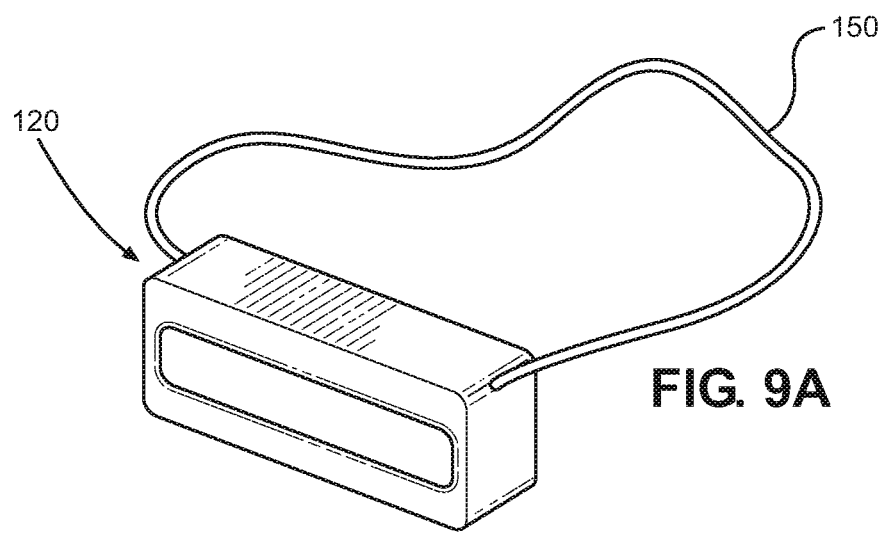
FIG. 9A shows a perspective view illustrating the warning unit adapted to be attached to a first responder by a neck chain according to an embodiment of the present invention.
Figure 9B:
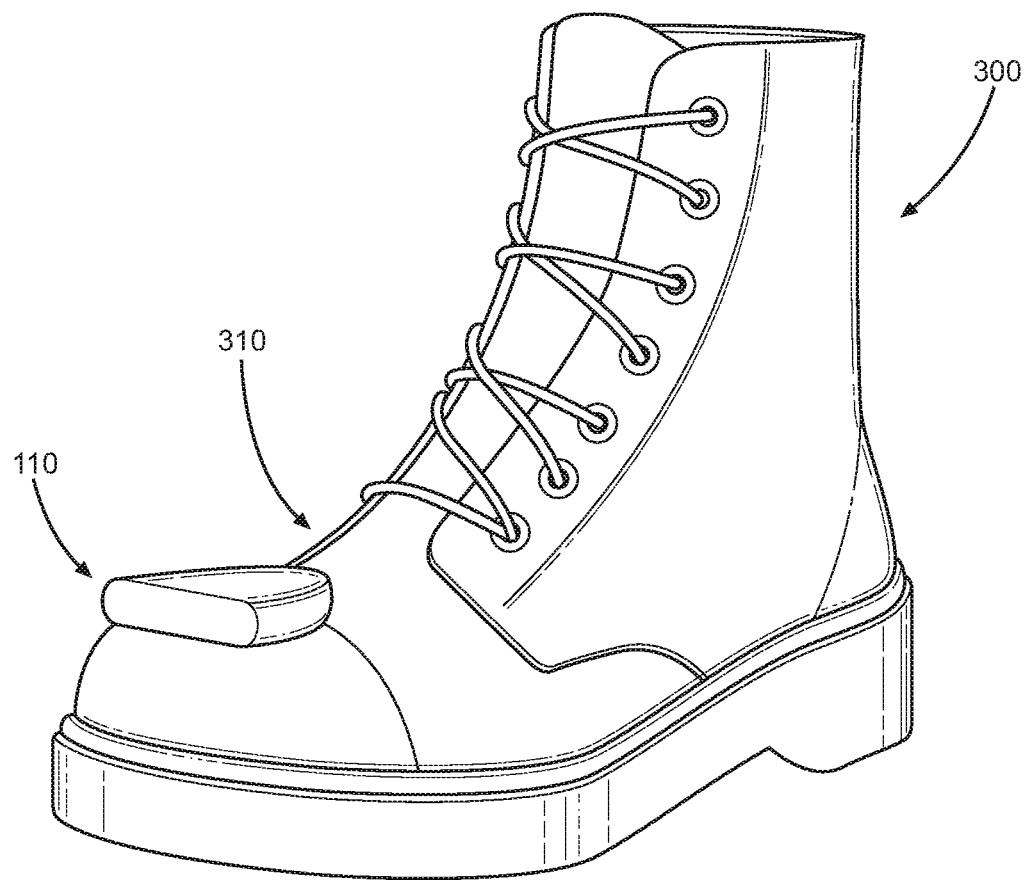
FIG. 9B shows a perspective view illustrating the warning system in combination with a shoe of a first responder according to an embodiment of the present invention.
Figure 10:
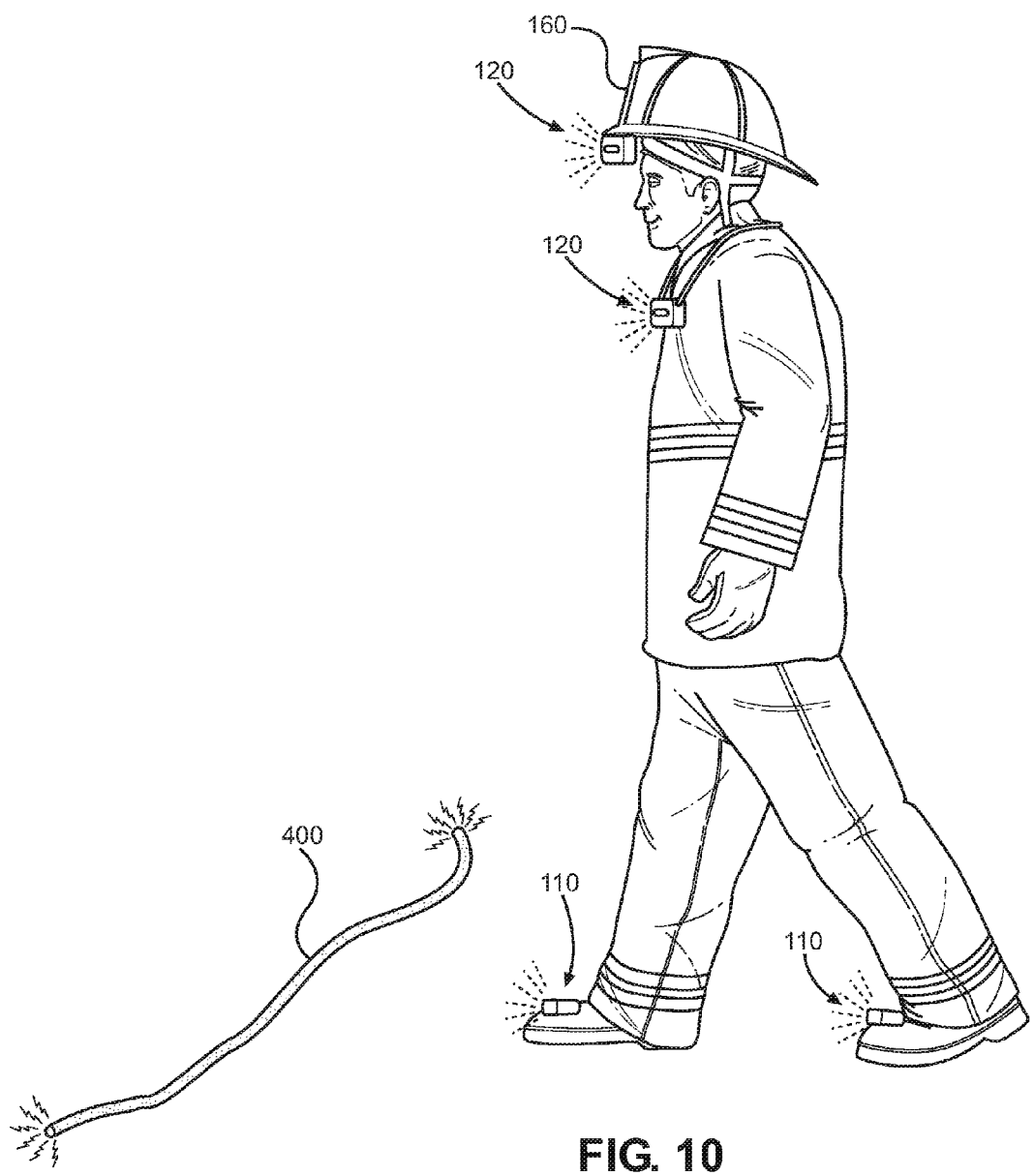
FIG. 10 shows a perspective view illustrating the warning system in-use with a shoe of a first responder according to an embodiment of the present invention.

FIGS. 9A & 9B and 10 show perspective views illustrating the combination of emergency responder footwear 300 and a warning system 100 according to an embodiment of the present invention.

The combination of emergency responder footwear 300 and a warning system 100 for emergency first responders approaching high voltage power lines 400. The emergency responder footwear 300 includes at least one footwear article having a toe section 310 having an external surface for attachment of a sensor unit 110. The warning unit 120 is adapted to be attached to the first responder, for example by a neck chain 150 or can be attached to a hat 160 worn by the first responder, such that it can receive a warning signal from the sensor unit transponder and the hologram projector 124 projects a holographic warning image for the emergency first responders to view.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A warning system for emergency first responders approaching high voltage power lines, said warning system comprising:
   a sensor unit comprising:
      an encasement;
      an antenna;
      a voltage meter;
      a power source; and
      a transponder;
         wherein said power source is electrically connected to and powers said antenna, said voltage meter, and said transponder;

wherein said antenna is adapted to send electric signals to said voltage meter; said voltage meter is adapted to receive and measure said antenna electrical signals for voltage quantities and variations and send a warning signal to said transponder upon detecting a predetermined level or change of electrical voltage; and said transponder is adapted to send a warning signal to a warning unit for emergency first responders;

wherein said antenna, said voltage meter, said power source, and said transponder are located within said encasement; and a warning unit comprising:
an encasement;
an antenna;
a power source; and
a hologram projector;
wherein said warning unit power source is electrically connected to and powers said warning unit antenna and said hologram projector; and
wherein said antenna is adapted to receive said warning signal from said sensor unit transponder and said a signal to said hologram projector, such that said hologram projector projects a holographic warning image for said emergency first responders to view;
wherein said antenna, said power source, and said hologram projector are located within said encasement; and wherein said sensor unit and said warning unit are separated from one another and adapted such that said sensor unit can be attached to the roof of an emergency vehicle, and said warning unit can be attached to a dashboard of said emergency vehicle and be able to project said warning image upon an inner surface of a windshield of said emergency vehicle.

2. The warning system of claim 1, wherein said sensor unit encasement and said warning unit encasement are formed from a plastic material.

3. The warning system of claim 1, wherein said holographic warning image forms the word "STOP".

4. The warning system of claim 1, wherein said sensor unit power source and said warning unit power source are batteries.

5. The warning system of claim 1, wherein said sensor unit further comprises magnets on an external surface of its encasement adapted to removably attach to a metal surface of said emergency vehicle.

6. The warning system of claim 1, wherein said warning unit further comprises a sound generator adapted to make a warning sound when said transponder sends a warning signal to said warning unit.

7. A system including an emergency vehicle and a warning system for emergency first responders approaching high voltage power lines, said system comprising:
an emergency vehicle including:
a roof;
a dashboard; and
a windshield; and
a warning system comprising:
a sensor unit comprising:
an encasement;
an antenna;
a voltage meter;
a power source; and
a transponder;
wherein said power source is electrically connected to and powers said antenna, said voltage meter, and said transponder;
wherein said antenna is adapted to send electric signals to said voltage meter; said voltage meter is adapted to receive and measure said antenna electrical signals for voltage quantities and variations and send a warning signal to said transponder upon detecting a predetermined level or change of electrical voltage; and said transponder is adapted to send a warning signal to a warning unit for emergency first responders;

wherein said antenna, said voltage meter, said power source, and said transponder are located within said encasement; and a warning unit comprising:
an encasement;
an antenna;
a power source; and
a hologram projector;
wherein said warning unit power source is electrically connected to and powers said warning unit antenna and said hologram projector; and
wherein said antenna is adapted to receive said warning signal from said sensor unit transponder and said a signal to said hologram projector, such that said hologram projector projects a holographic warning image for said emergency first responders to view;
wherein said antenna, said power source, and said hologram projector are located within said encasement; and wherein said sensor unit and said warning unit are separated from one another and adapted such that said sensor unit is attached to said roof of said emergency vehicle, and said warning unit is attached to said dashboard of said emergency vehicle and is able to project said warning image upon an inner surface of said windshield of said emergency vehicle.

8. The system of claim 7, wherein said warning unit further comprises a sound generator adapted to make a warning sound when said transponder sends a warning signal to said warning unit.

9. A system including emergency responder footwear and a warning system for emergency first responders approaching high voltage power lines, said combination comprising:
emergency responder footwear including:
at least one footwear article including:
a toe section having an external surface; and
a warning system comprising:
a sensor unit comprising:
an encasement;
an antenna;
a voltage meter;
a power source; and
a transponder;
wherein said power source is electrically connected to and powers said antenna, said voltage meter, and said transponder;
wherein said antenna is adapted to send electric signals to said voltage meter; said voltage meter is adapted to receive and measure said antenna electrical signals for voltage quantities and variations and send a warning signal to said transponder upon detecting a predetermined level or change of electrical voltage; and said transponder is adapted to send a warning signal to a warning unit for emergency first responders;

wherein said antenna, said voltage meter, said power source, and said transponder are located within said encasement; and a warning unit comprising:
an encasement;
an antenna;
a power source; and
a hologram projector;

wherein said warning unit power source is electrically connected to and powers said warning unit antenna and said hologram projector; and wherein said antenna is adapted to receive said warning signal from said sensor unit transponder and said a signal to said hologram projector, such that said hologram projector projects a holographic warning image for said emergency first responders to view;

wherein said antenna, said power source, and said hologram projector are located within said encasement; and wherein said sensor unit and said warning unit are separated from one another and adapted such that said sensor unit is attached to said external surface of said toe portion of said at least one emergency responder footwear, and said warning unit is adapted to be releasably attached to said emergency responder and is able to project said warning image upon a surface nearby said emergency responder.

10. The system of claim 9, wherein said warning unit further comprises a sound generator adapted to make a warning sound when said transponder sends a warning signal to said warning unit.

* * * * *